United States Patent
Phillips et al.

(10) Patent No.: US 6,541,576 B1
(45) Date of Patent: Apr. 1, 2003

(54) COMPOSITION AND METHOD FOR CURING A RESORCINOL RESIN

(75) Inventors: Earl K. Phillips, Diboll, TX (US); Arthur J. Garwood, deceased, late of Eugene, OR (US), by Judith K. Garwood, legal representative; William D. Detlefsen, Springfield, OR (US)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 09/068,510

(22) PCT Filed: Nov. 12, 1996

(86) PCT No.: PCT/US96/17899

§ 371 (c)(1),
(2), (4) Date: Aug. 11, 1998

(87) PCT Pub. No.: WO97/18251

PCT Pub. Date: May 22, 1997

(51) Int. Cl.[7] ............... C08F 283/00; C08G 8/28; C08L 61/14
(52) U.S. Cl. .......... 525/495; 525/498; 528/164; 528/129; 528/137; 528/146; 428/537.1
(58) Field of Search ............... 525/495, 498; 528/164, 129, 137, 146; 428/537.1

(56) References Cited

U.S. PATENT DOCUMENTS 4,116,740 A  9/1978 Musselman et al.
5,684,114 A  * 11/1997 Phillips et al. ............ 528/129

* cited by examiner

Primary Examiner—Duc Truong
(74) Attorney, Agent, or Firm—Stevens, Davis, Miller & Mosher, L.L.P.

(57) ABSTRACT

A catalyst curing system or hardener for resorcinolic resins, such as resorcinol-formaldehyde or phenol-resorcinol-formaldehyde resins including methylolurea. The methylolurea may be used in combination with oxazolidine in ratios ranging from 5:95 to 95:, by molar basis. The hardener crosslinks the resins which permits reduction or "fuming" of formaldehyde as well as control of gel times of the resulting adhesive. The hardener of the present invention if of particular utility in adhesives for use in the forest products industry.

17 Claims, 2 Drawing Sheets

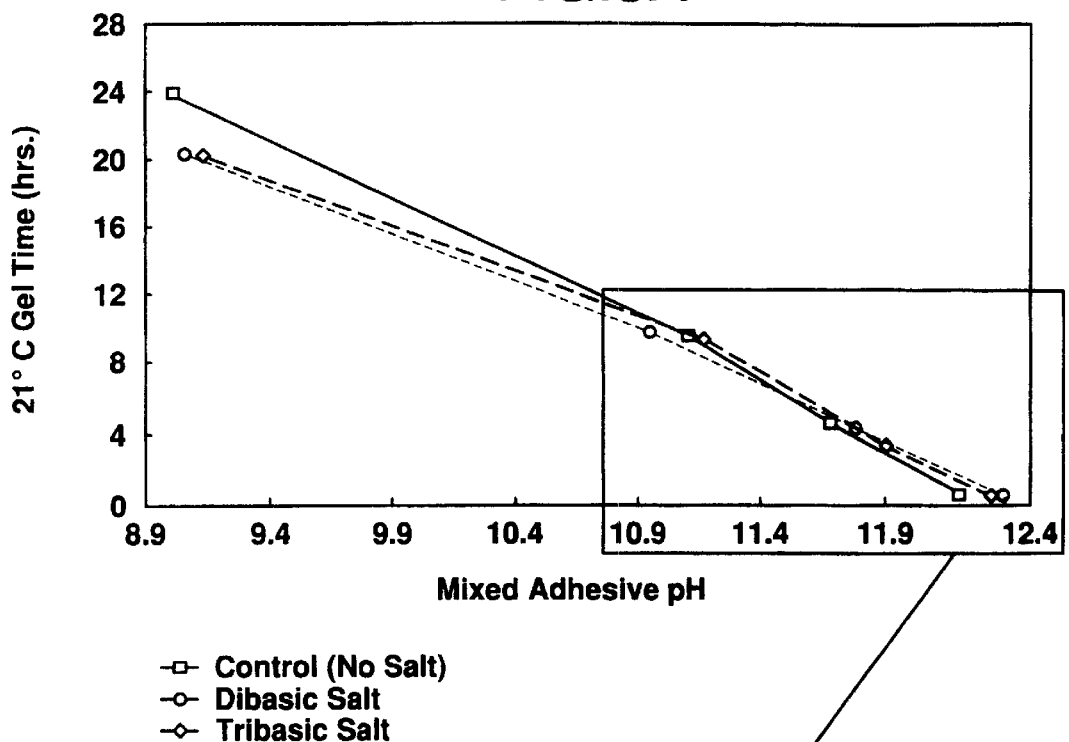
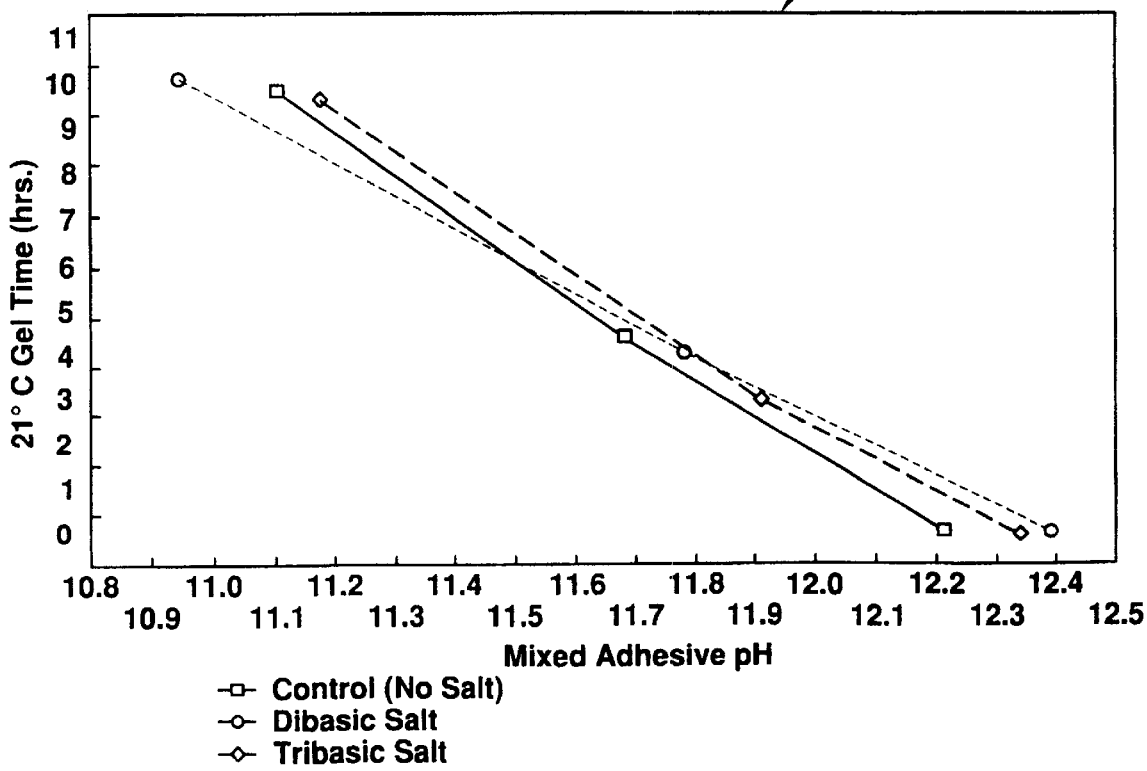

COMPOSITION AND METHOD FOR CURING A RESORCINOL RESIN

BACKGROUND OF THE INVENTION

1. Field of the Invention

The present invention is directed to a catalyst curing system and method of using the same to reduce emissions or "fuming" of formaldehyde in resorcinol-formaldehyde or phenol-resorcinol-formaldehyde resins. The present invention replaces a portion of oxazolidine, normally used for crosslinking of a resorcinol or phenol-resorcinol resin with a class of compounds normally called methylolureas, which are reaction products of formaldehyde and urea chemicals.

2. Description of the Related Art

Resorcinol-formaldehyde and phenol-resorcinol-formaldehyde resins are used as adhesives, such as in the wood products industry, to manufacture a variety of exterior rated laminated wood items. They are noted for their excellent exterior bonding properties, and their ability to fully crosslink and cure at temperatures as low as 60° F. The latter is important since most items produced with these adhesives in the wood products industry do not lend themselves to heated cure because of size or geometry. Both of these resins are manufactured with a deficiency of formaldehyde, to prevent premature and uncontrolled cure or gelation of the resin. In use they are catalyzed by adding a sufficient amount of additional reactant, normally formaldehyde in polymer form called paraformaldehyde, which causes the adhesive to thicken and gel, and eventually cure completely at room temperature. A major drawback to this method of catalysis is the off-gassing, or "fuming", of formaldehyde vapors from the adhesive while it is being used to manufacture a wood article. Plant workers may be exposed to these vapors, and this may pose a significant health risk under current OSHA regulations. One means of alleviating the problem of formaldehyde exposure in the workplace is the use of a methylene donor, or crosslinking agent, that does not release formaldehyde gas. One such material is a class of compounds known as oxazolidines. These compounds are the reaction product of formaldehyde and certain amino alcohols. When mixed with resorcinol or phenol-resorcinol resin they release formaldehyde to the resin for curing, but do not release a discernible amount of formaldehyde gas to the atmosphere. This makes them preferable to formaldehyde solution or paraformaldehyde as crosslinkers for the adhesives. The oxazolidines have two major drawbacks that prevent widespread acceptance in the marketplace, however. First, the gel times achieved with oxazolidines are generally much shorter than those obtained with conventional paraformaldehyde catalyst. This limits the plants that can use the oxazolidine catalyst to those with fast article assembly, such as wood I-beam processes. Secondly, the oxazolidine is much more expensive than formaldehyde solution or paraformaldehyde. Some plants that would like to have the low "fuming" properties of the oxazolidine catalyzed glue are unwilling to pay the additional price for this improvement.

For these reasons there is a long felt need for an improved low "fuming" catalyst system for resorcinol and phenol-resorcinol resins. The improvement should address problems inherent in the oxazolidine catalyst, namely, too rapid gelation and cure, and high cost. The improvement should lead to better control of cure time and lower cost, while maintaining the low "fuming" attribute of oxazolidine catalyst.

OBJECTS OF THE INVENTION

It is an object of the invention to provide an improved low "fuming" catalyst system for resorcinol and phenol-resorcinol resin systems.

It is a further object of the invention to provide methods of curing resorcinol and phenol-resorcinol resin systems where too rapid gelation and cure, and high cost, are avoided.

It is a still further object of the invention to provide improved adhesives and wood products employing them which have superior properties, e.g., bonding performance.

It is another object of the invention to provide adhesive compositions which have low fuming characteristics.

These and other objects will be more fully understood in conjunction with the following description of the invention.

SUMMARY OF THE INVENTION

We have discovered that replacement of a portion of the oxazolidine normally used for crosslinking of a resorcinol or phenol-resorcinol resin leads to improved performance of the adhesive, while substantially reducing the cost of the adhesive. The replacement material for the oxazolidine is the class of compounds normally called methylolureas, i.e., reaction products of formaldehyde and urea chemicals. These compounds do not "fume" formaldehyde, and also function as methylene donors for resorcinol or phenol-resorcinol resin, though the reactivity is such that room temperature cure of the resin cannot be achieved with conventional resin technology. There appears to be a synergy developed with the mixture of oxazolidine and methylolurea wherein the gluing performance is enhanced, and cost is substantially reduced.

There are two major types of wood products that use room temperature curing resorcinol or phenol-resorcinol adhesives. These are flat laminated beams, where lumber of various dimensions is laminated into structural load-bearing members, and wood I-beams, where lumber, plywood, laminated veneer lumber (LVL), and oriented strandboard (OSB) are glued into composite structural members. The assembly of flat laminated beams requires the use of adhesives that have a working life, or pot-life, of 120–240 minutes. This working life is achieved with paraformaldehyde catalysts by using a moderated paraformaldehyde with reduced reactivity. Wood I-beams however, are assembled by machine, and the adhesive is usually mechanically mixed immediately prior to application. This operation actually benefits from the use of a short working life and fast gel time adhesive. An oxazolidine catalyst works very well in the I-beam application, aside from the high cost of the adhesive. When an amount of oxazolidine sufficient to cause complete crosslink cure of the resin is used, the working life of the adhesive mix is usually 60 minutes or less. This is too short for use in the flat beam laminating process, where the beam is often assembled and clamped by hand. It is not possible to extend the working life of the oxazolidine catalyzed adhesive by merely reducing the level of catalyst, since an amount sufficient to cause complete crosslink cure of the resin is necessary. Other methylene donors such as nitro alcohols and hexamethylenetetramine (hexa) have been used in the past as crosslinkers for resorcinol or phenol-resorcinol resin. They are not used to any great degree in wood bonding because of poor bonding performance or high cost. In the case of hexa, ammonia is generated during the curing process, and is emitted from the glue.

By using a catalyst composed of a mixture where part of the oxazolidine is replaced by methylolurea, several improvements are realized. Working life of the adhesive mix is proportional to the amount of methylolurea substituted for oxazolidine. This greatly improves the bonding performance of the adhesive when doing flat beam laminating, as working life up to 180 minutes is easily achieved. Methylolurea does not emit a volatile gas when it functions as a methylene donor to the resin, thus noxious emissions are minimized. Methylolurea is inexpensive, on the order of $0.10/lb., compared to $1.50/lb. or higher for oxazolidine.

Laboratory tests have demonstrated the superior bonding performance of the oxazolidine/methylolurea mixture when compared to oxazolidine alone.

BRIEF DESCRIPTION OF THE DRAWINGS

FIG. 3a illustrates the effect of mixed pH on the 21° C. gel time of LT-5210/100% methylolurea when modified with Potassium Phosphate buffer salts. The resin to methylolurea mix ratio was 100 to 32 parts, by weight.

FIG. 3b is an enlarged scheme of FIG. 3a at an absicca from pH 10.8 to 12.5.

DETAILED DESCRIPTION OF THE INVENTION AND EXAMPLES

Figure 1:
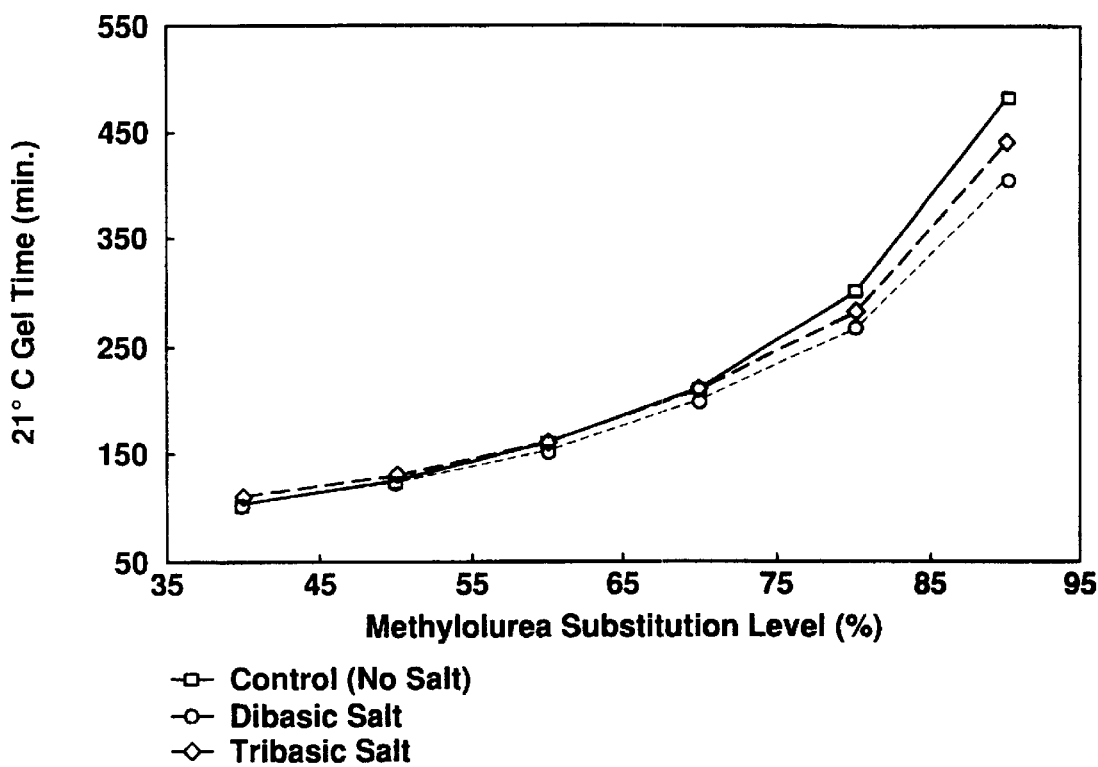
FIG. 1 illustrates the effect of monomethylolurea substitution level in FM-7210 on the 21° C. gel time of LT-5210/FM-7210 when modified with Potassium Phosphate buffer salts. The resin to slurry mix ratio was 2.5 to 1, by weight.

The preferred method of using the invention is to replace a portion of the oxazolidine in a hardener, intended to be used with a resorcinol or phenol-resorcinol resin, with methylolurea. Such a catalyst is designed to contain a certain amount of formaldehyde equivalence, on a molar basis. The substitution of methylolurea for a portion of the oxazolidine is done so as to retain the overall formaldehyde equivalence of the catalyst solution. This catalyst solution may then be used as-is to catalyze a resin, or it may be used to compound a liquid "slurry" catalyst which in turn is used to catalyze a resin.

In the preferred method the methylolurea is formed in situ from formaldehyde and urea. This is done by making a mixture of oxazolidine with 50% formaldehyde solution, urea, and caustic soda solution. As stated previously, the amount of formaldehyde in the solution is equal to the formaldehyde equivalence of the oxazolidine that is being replaced. A slight excess amount of urea is used, above that necessary to form methylolurea, so as to shift the equilibrium and minimize free formaldehyde in the solution. Caustic sodium hydroxide is added to adjust pH to the range of 9–11, which is conducive to the formation of methylolurea. This solution is essentially odor free and can be used as a catalyst for resin. In the preferred method, however, this solution is mixed with fillers and flow modifiers to produce a "slurry" catalyst which can be used with on-demand meter-mix equipment, as is normally done in wood products plants. This slurry is metered and mixed with a metered amount of resorcinol or phenol-resorcinol resin to yield an adhesive mix that is used to bond wood.

In a preferred method the replacement of oxazolidine with methylolurea amounts from about 20% to about 70% replacement of oxazolidine with methylolurea formaldehyde equivalence in the catalyst solution, with 40% replacement being the most preferred embodiment, noting however, that the preferable and most preferable embodiments of percentage replacement of oxazolidine with an methylolurea may vary depending on pH. This substituted catalyst solution is then used in place of oxazolidine to produce a slurry catalyst. An adhesive mix is made with this slurry catalyst and a resorcinol or phenol-resorcinol resin. The mix ratio of the slurry catalyst to resin is sufficient to provide an amount of formaldehyde equivalence to assure complete crosslink cure of the resin. This ratio is in the range of 1.5:1 to 3.5:1, resin:slurry, and most typically 2:1 to 3:1, resin:slurry, by volume.

Typical fillers used in slurry hardeners include clays, nutshell flours, and fine mesh wood flours. The fillers generally provide a certain amount of gap-filling character and thixotropy to the adhesive or glue. Slurry flow modifiers include such things as dispersants and surfactants which tend to lower slurry viscosity and make it easier to pump.

The invention is specific in the allowable resin types, namely, resorcinol formaldehyde or phenol-resorcinol formaldehyde polymers or modifications of these polymers through use of tannins, cresols, xylenols, lignins, or other materials that could result in terms of equivalent wood product gluing. The invention does include all forms of these resins that are suitable for wood gluing processes, including but not limited to flat laminated beams, wood I-beams, fingerjointing, veneer lamination, general millwork, or specialty products made with wood chips, veneers, flakes, strands, or fibers. These resins may be alkaline, neutral pH, or acidic, and may be considered resoles, or novolacs. The class of compounds known as oxazolidines may be any reaction product of an aldehyde and any aminohydroxy compound that yields saturated heterocyclic compounds capable of functioning as methylene donors during polymer resin cure. The class of compounds known as methylolurea would include any reaction product of an aldehyde and urea that is capable of functioning as a methylene donor during polymer resin cure. These reaction products include, but are not limited to, mono-, di-, and polyfunctional methylolureas, and any urea/aldehyde polymer or oligomer that has methylol functionality or available methylene equivalents.

The methylolurea may be formed in situ with the oxazolidine or amino alcohol present, as outlined in the preferred method, or it may be added, as a previously prepared or purchased chemical or material. While sodium hydroxide is used in the preferred method, any alkaline pH modifier may be used in the manufacture of methylolurea. The methylolurea/oxazolidine mixture may be used as a catalyst for the polymer resin by itself, or as a component of a hardener mixture or slurry. The methylolurea and oxazolidine may also be mixed with the polymer resin as separate components to achieve the same end result, that is, the adhesive mix composed of resin, crosslinking catalyst, and optional fillers or modifiers.

The permissible ratio of substitution of methylolurea for oxazolidine is 5:95 to 95:5 on a fornaldehyde functionality basis. The permissible ratio of methylolurea/oxazolidine catalyst to resorcinol or phenol-resorcinol resin is any amount of catalyst sufficient to cause complete crosslink cure of the resin. Generally this amount is that necessary to give an overall molar ratio of moles of aldehyde functionality moles of resorcinol or phenol-resorcinol of about 1:1.

EXAMPLES

Following are examples of the invention. The catalyst system is sometimes described as a "hardener" in that it causes the resin to crosslink into an infusible product.

Example 1

A solution of methylolurea was prepared by dissolving 200 grams of urea in 150 grams water, adding 100 grams 50% formaldehyde solution, and adjusting pH with 1 gram of 50% sodium hydroxide solution. This was then used as catalyst to determine gel time with a phenol-resorcinol resin (Borden Cascophen® LT-5210). A comparison was made to the same resin catalyzed with an oxazolidine (Zoldine® ZT-55) slurry.

| | | |
|---|---|---|
| 1. LT-5210 resin | 100 parts | no gel overnight |
| Methylolurea sln. | 32 parts | |
| 2. LT-5210 resin | 100 parts | no gel overnight |
| Methylolurea sln. | 82 parts | |
| 3. LT-5210 resin | 100 parts | 60 minute gel @ 21° C. |
| ZT-55 slurry (80%) | 40 parts | |

These data show that methylolurea solution is not a very effective crosslinking catalyst for phenol-resorcinol resin when used alone. The data also indicate the expected gel time of the resin when catalyzed with oxazolidine crosslinker.

Example 2

Catalyst slurries were made with an oxazolidine (Zoldine® ZT-55) and different substitution levels of methylolurea (MU). These were then mixed with a phenol-resorcinol resin (Cascophen® LT-5210) for gel time determination.

| | | |
|---|---|---|
| 1. ZT-55 oxazolidine slurry (control) | 1 part | |
| LT-5210 resin | 2.5 parts | |
| 21° C. gel time | 63 minutes | |
| 2. ZT-55 (60%)/MU (40%) | 1 part | |
| LT-5210 resin | 2.5 parts | |
| 21° C. gel time | 100 minutes | |
| 3. ZT-55 (50%)/MU (50%) | 1 part | |
| LT-5210 resin | 2.5 parts | |
| 21° C. gel time | 129 minutes | |
| 4. ZT-55 (40%)/MU (60%) | 1 part | |
| LT-5210 resin | 2.5 parts | |
| 21° C. gel time | 149 minutes | |

As illustrated in FIG. 1, these data show that there is a proportional increase in gel time as the oxazolidine is replaced with methylolurea in the adhesive mix. All gels were equivalent in hardness, and gave no indication of having insufficient crosslinking.

Example 3

The adhesive mixes from Example 2 were subjected to testing as per ASTM D2559-90, standard specification for Adhesives For Structural Laminated Wood Products For Use Under Exterior (Wet Use) Exposure Conditions. The glued beams were cured at 70–75° F. Block shear specimens were tested for compression strength and percent wood failure, and delamination was determined after cyclic delamination testing. In the case of the block shear tests, high breaking strength and high wood failure are desirable, indicating that the glued wood and not the cured glue is failing in the destructive testing. A low value in the delamination test is desirable, indicating that the glued wood specimen is resisting the effects of cyclic soaking and drying.

| Adhesive Mix | Shear (psi) | Wood Failure (%) | Delamination (%) |
|---|---|---|---|
| 1. 100% oxazolidine | 1551 psi | 88% | 6.63% |
| 2. 60% oxazolidine/40% MU | 1515 psi | 92% | 1.83% |
| 3. 50% oxazolidine/50% MU | 1466 psi | 89% | 1.53% |
| 4. 40% oxazolidine/60% MU | 1563 psi | 91% | 0.93% |

The shear breaking strength mainly reflects the breaking strength of the wood if percent wood failure is good. The minimum shear strength allowed is 1075 psi average, and all four adhesives exceeded this. The depth of adhesive penetration of the control adhesive, 100% oxazolidine, was not as good as the adhesives containing the methylolurea replacement for portions of the oxazolidine. This is reflected minimally in the percent wood failure, and dramatically in the average percent delamination.

Example 4

The four adhesive mixes described in Example 2 were glued again in the same manner as described in Example 3. We used the same resin lot (a phenol resorcinol resin (Borden Cascophen® LT-5210)) and slurry samples that were used in the foregoing Example 2. The only variables were those associated with the method itself, and of the wood that was used and the resulting products were again tested in accordance with ASTM D-2559-90.

Conditions:

Resin: Inventive Hardener Mix Ratios—2.5:1

Resin: Control Borden, Inc.'s (FM-7210) Hardener Mix Ratio—2.5:1

Mixed glue temperatures—70° F.

Douglas fir wood temperature—70–75° F.

Glue spread—65 lbs. per thousand square feet

Assembly times—10 minutes

Cure temperatures—70–75° F.

Cure time—overnight

Post cure times at 70–75° F.—7 days.

Testing:

Block shear specimens were tested for compression shear strength and percent wood failure (%WF). The durability was determined by a cyclic vacuum pressure delamination test. The percent delamination following cyclic exposure was determined.

Results:

| Adhesive Mix | Specimens | Shear (psi)* | % WF | Specimens | % Delamination** |
|---|---|---|---|---|---|
| 100% oxazolidine (Control) | 20 | 1356 | 72 | 3 | 7.33 |
| 60% oxazolidine/40% MU | 20 | 1484 | 84 | 3 | 0.87 |
| 50% oxazolidine/50% MU | 20 | 1272 | 85 | 3 | 1.27 |

-continued

| Adhesive Mix | Speci-mens | Shear (psi)* | % WF | Specimens | % Delamination** |
|---|---|---|---|---|---|
| 40% oxa-zolidine/ 60% MU | 20 | 1242 | 85 | 3 | 1.87 |

*The minimum required average shear strength is 1075 psi
**The maximum allowable average % delamination is 5.0%

Observation:

The % WF was again clearly better in all inventive versions than with the control hardener.

The durability tests again showed all inventive versions to be superior to the control under room temperature curing conditions.

Example 5

Expansion of Example 2 Data to Include Methylolurea up to the 90% Replacement Level In preparation for a further laboratory gluing series, six fresh experimental slurries were prepared. The methylolurea substitution levels were 40, 50, 60, 70, 80 and 90% of the oxazolidine (Zoldine ZT-55) level normally found in Borden, Inc.'s FM-7210 hardener. The 21° C. gel times were determined as described in Example 2. The control mix data shown below was from Example 2 and was not repeated. These data again show the proportional increase in gel time as the oxazolidine is replaced with methylolurea in the adhesive mix.

| | |
|---|---|
| 1. ZT-55 oxazolidine slurry (control) | 1 part |
| LT-5210 resin | 2.5 parts |
| 21° C. gel time | 63 minutes |
| 2. ZT-55 (60%)/MU (40%) | 1 part |
| LT-5210 resin | 2.5 parts |
| 21° C. gel time | 104 minutes |
| 3. ZT-55 (50%)/MU (50%) | 1 part |
| LT-5210 resin | 2.5 parts |
| 21° C. gel time | 126 minutes |
| 4. ZT-55 (40%)/MU (70%) | 1 part |
| LT-5210 resin | 2.5 parts |
| 21° C. gel time | 159 minutes |
| 5. ZT-55 (40%)/MU (60%) | 1 part |
| LT-5210 resin | 2.5 parts |
| 21° C. gel time | 211 minutes |
| 6. ZT-55 (20%)/MU (80%) | 1 part |
| LT-5210 resin | 2.5 parts |
| 21° C. gel time | 303 minutes |
| 7. ZT-55 (10%)/MU (90%) | 1 part |
| LT-5210 resin | 2.5 parts |
| 21° C. gel time | 486 minutes |

Examples 6–8 Report Data Summary from use of the Inventive Hardener in I-joist Assembly and Structural Fingerjoint Applications Example 6

Conditions:

Resin (LT-5210 Phenol Resorcinol): Inventive Hardener Mix Ratio—2.65:1

Resin (LT-5210 Phenol Resorcinol): Control (Borden, Inc.'s FM-6210) Hardener Mix Ratio—2.8:1

Mixed glue temperatures—84° F.

OSB web and Douglas fir LVL flange temperatures—81–84° F.

Glue spread—1400 grams per 1000 lineal inches

Assembly times—less than 30 seconds

Oven cure temperatures—110–130° F.

Oven dwell time—30–60 minutes

Post cure times at 70–80° F.—0 minutes and 15 hours

Testing:

The usual test for composite wood I-joists is a bending test where an eight foot length is stressed in bending until the specimen breaks. The total load (psi) at the time of breaking is determined. The value is typically expressed in terms of a safety factor. The usual specification is that the safety factor must meet or exceed 2.3, or 2.3 times the design load in bending for the particular constructions.

Results:

The average safety factor found for 10 specimens was 3.0

The normal average safety factor range for LT-5210 or FM-6210 at a commercial facility is 2.9–3.2

Observation:

The wood failure was judged to be better than normal. Safety factors were in the normal range.

Example 7

Conditions:

Resin (LT-5210 Phenol Resorcinol): Inventive Hardener Mix Ratios—2.4:1 and 2.8:1

Resin (LT-5210 Phenol Resorcinol): Control FM-7210 Hardener Mix Ratio—2.8:1

Mixed glue temperatures—73° F.

OSB web and Douglas fir LVL flange wood temperatures—83–85° F.

Glue spread—was not measured, but appeared normal

Assembly times—less than 5 minutes

Oven cure temperatures—100–110 ° F.

Oven dwell time—2 hours

Post cure times at 70–80° F.—3 days

Testing:

Same testing as described in Example 6.

Results:

| | Experimental FM-7340 | | | Control FM-7210 | | |
|---|---|---|---|---|---|---|
| I-Joists | Speci-mens | Load (psi) | Safety Factor | Speci-mens | Load (psi) | Safety Factor |
| 9.5 inch depth | 26 | 7493 | 3.33 | 14 | 7798 | 3.47 |
| 18 inch depth | 30 | 11702 | * | 15 | 11222 | * |

* Safety Factor numbers not available

Observation:

No statistical differences were found in strength and wood failure factors.

Example 8

Resorcinol Formaldehyde Resin with Inventive Hardener

Conditions:

Resin (FJ-3030, resorcinol formaldehyde): Inventive Hardener Mix Ratio—2.36:1

Resin (FJ-3030, resorcinol formaldehyde: Control (Borden, Inc.'s FM-7210) Hardener Mix Ratio—2.3:1

Mixed glue temperature—70° F.

2×4 inch, 24000F SPF lumber temperatures—63–65°

Glue spread—was not measured, but appeared normal

Assembly times—less than 5 minutes

Fingerjoint Cure temperatures achieved—210° F. and above

Post cure times at 70–80° F.—30–40 minutes

Testing:

The typical test for structural fingerjoints is a tension test where a 6 foot piece with single fingerjoint in the middle is stressed in tension until failure. The load (psi) at the time of breaking is determined. The safety factor criteria will depend upon the species, size and grade of lumber being joined. The percent wood failure (% WF) in the fingerjoint area is also determined.

Results:

| Inventive hardener | | | | Control hardener | | | |
|---|---|---|---|---|---|---|---|
| Speci-mens | % WF | Load (psi) | Safety Factor | Specimens | % WF | Load (psi) | Safety Factor |
| 50 | 98 | 6410 | 3.24 | 29 | 98 | 6596 | 3.33 |

Observation:

No statistical differences were found in strength and wood failure factors.

Example 9

Figure 2:
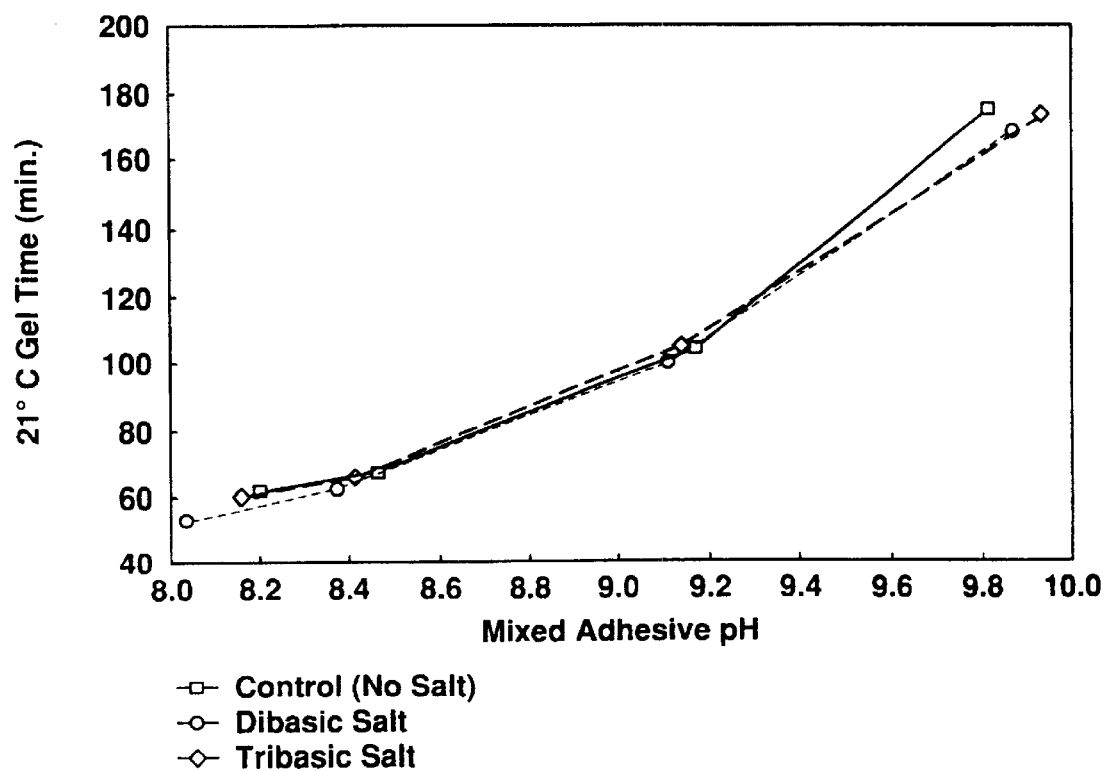
FIG. 2 illustrates the effect of mixed adhesive pH on the 21° C. gel time of LT-5210/FM-7340 when modified with Potassium Phosphate buffer salts. The resin to hardener mix ratio was 2.5 to 1, by weight.

The effect of pH on the gel time of a phenol-resorcinol resin (LT-5210) with the hardener of the invention (resin:slurry hardener mix ratio for all mixes of this example was 2.5 to 1 part, by weight, respectively) is shown in the following Table, and graphically in FIG. 2.

| Mix pH | 21° C. Gel time (minutes) |
|---|---|
| 8.20 | 62 |
| 8.46 | 68 |
| 9.17 | 104 |
| 9.81 | 175 |

Example 10

The effect of pH on gel time of phenol-resorcinol resin (LT-5210) with 100% methylolurea solution as hardener (at a resin:hardener mix ratio of 100 parts to 32 parts, by weight, respectively for all mixes of this example) is as follows:

| Mix pH | 21° C. Gel time (hours) |
|---|---|
| 9.00 | 23.9 |
| 11.10 | 9.5 |
| 11.68 | 4.6 |
| 12.21 | 0.7 |

These values are shown graphically in FIGS. 3a and 3b.

Example 11

ASTM D 3535-90 Test Data for 40–70% Methylolurea Substituted Slurries

Four experimental slurries having 40 to 70% methylolurea substituted for oxazolidiine were tested with LT-5210 resin. The resin:slurry hardener mix ratio was 2.5:1, by weight. Four specimens were prepared using maple wood. The layups and testing were in conformance with the ASTM D 3535-90 Standard. Two specimens each were placed in the respective environments after loading to the required compression stress condition in special jigs. After one week the specimens were removed from the respective environmental conditions and jigs. The gluelines were closely observed, using a magnifier, for deformation (creep). The total deformation shall not exceed 0.139 inches for both test specimens and each variable combination.

| | | Measured Creep, to nearest 0.005 inch | |
|---|---|---|---|
| Experimental slurry hardener | Spec-imen | 160° F. Condition ambient humidity | 80° Condition 90% Rel. Humidity |
| 1. ZT-55 (60%)/MU (40%) | 1 | 0 | 0 |
| ZT-55 (60%)/MU (40%) | 2 | 0 | 0 |
| 2. ZT-55 (50%)/MU (50%) | 1 | 0 | 0 |
| ZT-55 (50%)/MU (50%) | 2 | 0 | 0 |
| 3. ZT-55 (40%)/MU (60%) | 1 | 0 | 0 |
| ZT-55 (40%)/MU (60%) | 2 | 0 | 0 |
| 4. ZT-55 (30%)/MU (70%) | 1 | 0 | 0.025 |
| ZT-55 (30%)/MU (70%) | 2 | 0.005 | 0.005 |

Example 12

The four experimental adhesive mixes described in Example 5 were glued in a similar manner as described in Example 3. We used the same resin lot that was used for the first two gluing series. In this series the density of the Douglas fir was limited to a specific gravity range of approximately 0.43 to 0.48. Testing was in accordance with ASTM D 2559-90 Standard for phenol-formaldehyde resorcinol and resorcinol formaldehyde resins.

Conditions:

Resin: Experimental Hardener Mix Ratios—2.5:1 by weight

Resin: Control FM-7210 Hardener Mix Ratio—2.5 1 by weight

Mixed glue temperatures—70°

Douglas fir wood temperatures—70–75°

Glue spread—65 lbs. per thousand square feet

Assembly times—10 minutes

Cure temperatures—70–75° F.

Cure time—clamped for overnight

Post cure times at 70–75° F.—7 days

Testing:

Block shear specimens were tested for compression shear strength and percent wood failure (%WF). The durability was determined by a cyclic pressure delamination test. The percent delamination following cyclic exposure was determined.

Results:

| Adhesive Mix | Speci-mens | Shear (psi)* | % WF | Speci-mens | % Delami-nation** |
|---|---|---|---|---|---|
| 100% oxazolidine (Control) | 20 | 1484 | 90 | 3 | 0.2 |
| 60% oxazolidine | 20 | 1499 | 94 | 3 | 0 |
| 50% oxazolidine | 20 | 1508 | 94 | 3 | 0.33 |
| 40% oxazolidine | 20 | 1392 | 96 | 3 | 0.87 |
| 30% oxazolidine | 20 | 1436 | 96 | 3 | 0.6 |

* The minimum required average shear strength is 1075 psi
** The maximum allowable average % delamination is 5.0%

Observation:

The % WF was again better in all experimental versions than with the control hardener.

Example 13

A stock dimethylolurea chemical was utilized in combination with Borden Resin WS 421-126. This resin has no gel without adding a crosslinker. The following composition was made:

10 g dimethylolurea;

50 g WS 421-126.

BWG-1.9 minutes, no formaldehyde odor.

Differential scanning calorimetry (DSC) data were generated to examine more closely the contribution of methylolureas (which replace a portion of the oxazolidine in the slurry catalyst system of the invention) toward the catalyzation of Cascophen® LT-5210Q phenol resorcinol formaldehyde (PRF) resin. Two levels of catalyst additions were investigated as shown in the following Table. In DSC, the peak areas are a direct measure of the heat of chemical reaction, or total exotherm in Joules/gram (J/g). These data indicate that formaldehyde donated by the methylolureas is a major contributor to total exotherm, as well as affecting the physical nature of the cured plug after the run (systems 1,5). Oxazolidine alone (systems 2,3 and 6,7) gave earlier onset and peak temperatures. Addition of monomeric urea tended to slow down reactivities (systems 4,8 vs systems 3,7). In summary the data indicates that when present, methylolureas are important contributors to the reactivity of a PRF adhesive system.

TABLE

DSC results for mixes containing 50 g of Cascophen® LT-5210Q with various levels of catalysts. WS-554-103B is a catalyst blend comprised of 60% Angus Zoldine® ZT-55 and 40% methylolurea. 20° C./min scan rate.

| System | Catalyst | Exotherm (J/g) | Peak (° C.) | Onset (° C.) | Sample Characteristics After Run |
|---|---|---|---|---|---|
| 1. | 16.1 g WS-544-103B | 111 | 96.5 | 64.6 | Hard rubbery |
| 2. | 16.1 g ZT-55 | 93 | 85.4 | 58.3 | Hard/brittle |
| 3. | 16.1 g 29% ZT-55[1] | 42 | 91.0 | 61.8 | Soft rubber |
| 4. | 16.6 g 29% ZT-55/ 38% urea[2] | 40 | 93.9 | 63.3 | Soft rubber |
| 5. | 6.6 g WS-544-103 | 79 | 97.7 | 67.0 | Soft rubber |
| 6. | 6.6 g ZT-55 | 65 | 85.3 | 59.6 | Rubbery |

TABLE-continued

DSC results for mixes containing 50 g of Cascophen® LT-5210Q with various levels of catalysts. WS-554-103B is a catalyst blend comprised of 60% Angus Zoldine® ZT-55 and 40% methylolurea. 20° C./min scan rate.

| System | Catalyst | Exotherm (J/g) | Peak (° C.) | Onset (° C.) | Sample Characteristics After Run |
|---|---|---|---|---|---|
| 7. | 6.6 g 29% ZT-55[3] | 20 | 87.0 | — | Liquid |
| 8. | 6.6 g 29% ZT-55/ 38% urea[4] | 19 | 87.3 | 60.8 | Liquid |

[1]Provides the amount of ZT-55 in 16.6 g of WS-544-103B.
[2]Provides the amount of ZT-55 and urea in 16.6 g of WS-544-103B
[3]Provides the amount of ZT-55 in 6.6 g of WS-544-103B.
[4]Provides the amount of ZT-55 and urea in 6.6 g of WS-544-103B.

Although the preceding description has emphasized the use of the novel hardener of this invention, in the context of resins or adhesives for the forest products industry, e.g., LVL and OSB, it is by no means limited to this utility but may be utilized wherever resorcinolic resins are utilized where control of cure time and/or cost is a consideration. Although we have disclosed a binary system of a hardener including methylolureas and oxazolidine, it should be apparent that others skilled in the art would readily find obvious modifications by including nitroalkanes, nitroalcohols and alkylene amines or their precursors with the hardener disclosed by the present invention.

We claim:

1. A composition of matter comprising a slurry of dimethylolurea and oxazolidine in combination with a resorcinolic resin, wherein the ratio of dimethylolurea to oxazolidine is from 5:95 to 95:5, by molar basis.

2. The composition of claim 1 further including fillers.

3. The composition of claim 1 further including flow modifiers.

4. The composition of claim 1 wherein the resorcinolic resin is a resorcinol formaldehyde resin.

5. The composition of claim 1 wherein the resorcinolic resin is a phenol-resorcinol formaldehyde resin.

6. A hardener for resorcinolic resins comprising dimethylolurea and oxazolidine in slurry form.

7. The hardener of claim 6 wherein the ratio of dimethylolurea to oxazolidine is from 5:95 to 95:5, by molar basis.

8. A wood product comprising wood particles which are adhered to each other by an adhesive composition comprising a resorcinolic resin and a hardener, wherein the hardener consists of oxazolidine and methylolurea in slurry form.

9. The wood product of claim 8 wherein the wood particles are wood chips.

10. The wood product of claim 8 wherein the wood particles are wood veneers.

11. The wood product of claim 8 wherein the wood particles are strands.

12. A wood product comprising a woodjoint which woodjoint is filled with an adhesive composition comprising a resorcinolic resin and a hardener, wherein the hardener consists of oxazolidine and methylolurea in slurry form.

13. The wood product of claim 12 wherein the wood product is a fingerjointed lumber.

14. The wood product of claim 12 wherein the wood product is a laminated beam.

15. The wood product of claim 12 wherein the wood product is an I-beam.

16. The wood product of claim 12 wherein the wood product is a lumber flange joined to a web member selected from the group consisting of oriented strand board, lumber and plywood.

17. The wood product of claim 12 wherein the wood product is a laminated veneer lumber flange joined to a web member selected from the group consisting of oriented strand board, lumber and plywood.

* * * * *